UNITED STATES PATENT OFFICE.

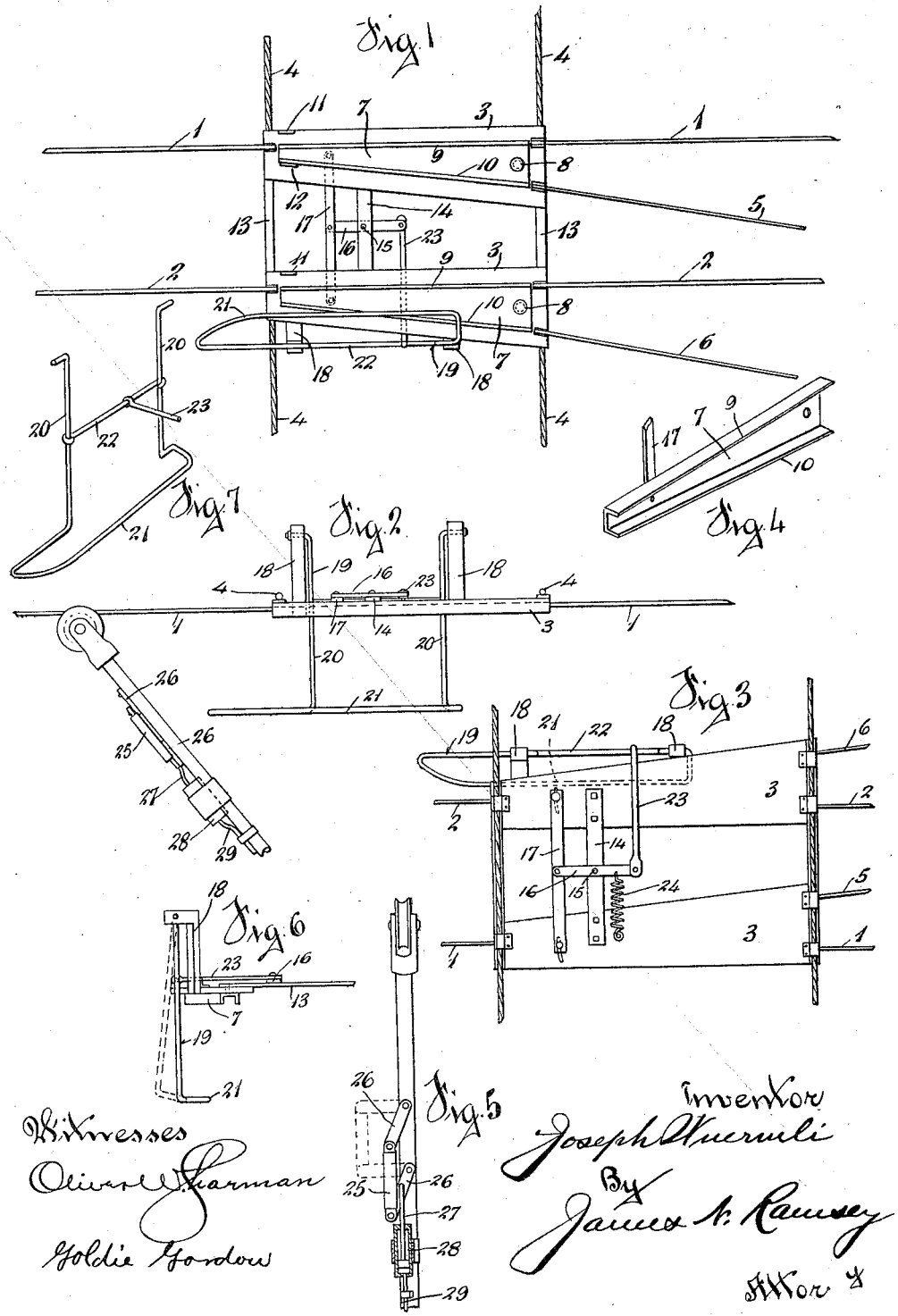

JOSEPH WUERMLI, OF CINCINNATI, OHIO.

TROLLEY-SHIFTING DEVICE.

1,032,796.   Specification of Letters Patent.   Patented July 16, 1912.

Application filed March 18, 1912. Serial No. 684,462.

*To all whom it may concern:*

Be it known that I, JOSEPH WUERMLI, a citizen of the United States, residing at Cincinnati, in the county of Hamilton and State of Ohio, have invented certain new and useful Improvements in Trolley-Shifting Devices, of which the following is a specification.

My invention relates to trolley shifting devices.

The object of my invention is to provide a simple, inexpensive and efficient device for shifting the trolleys from one wire to another from the vestibule of the car thereby dispensing with the necessity of pulling the trolley poles out of engagement with the trolley wires.

My invention comprises a plate connected to the trolley wires and which is adapted to be suspended by means of guy wires fastened to the top thereof, a switch pivoted on said plate on its under side having two flanges over which the trolley wheel is adapted to run, upright posts mounted on the side of said plate, a shifting arm pivoted at the top of said posts and extending downwardly to a point below said plate, said shifting arm being provided with a horizontal engaging portion at the bottom thereof, a series of arms connected to the operating shifting arm and to the switch whereby the switch is moved laterally when said shifting arm is moved upon its pivot, a collapsible frame on said trolley pole, an air valve on said trolley pole having a piston, the piston being connected to said frame whereby said frame is operated for the purpose of engaging said shifting arm.

My invention further consists in the certain details of construction and combination of parts as herein set forth and claimed.

In the drawings: Figure 1 is a view of a section of trolley wires with my invention placed therein and looking at the under side of the device; Fig. 2 is a side elevation showing the end of the trolley pole about to pass by the shifting device; Fig. 3 is a plan view of the shifting device; Fig. 4 is a detail perspective view of the switch;
Fig. 5 is a view in elevation of a fragment of a trolley pole showing the collapsible frame mounted thereon and the valve for operating same; Fig. 6 is an end elevation of one of the shifting devices; Fig. 7 is a perspective view of the shifting arm.

My device as shown in the drawings is adapted to be placed in wires for the double trolley system there being two trolley wires parallel with each other and a switch placed in each.
1 and 2 represent trolley wires in which are placed plates 3. These plates 3 are securely fastened to the trolley wires in any suitable manner and are also adapted to be suspended by means of guy wires 4 at each end of the plate 3. These guy wires are fastened to the poles near the curb as usual. The trolley wires 1 and 2 are substantially straight and when the trolleys engage these wires they are adapted to continue in the same direction. When, however, it is desired to deviate from the straight line and to turn a corner or the like I provide two more trolley wires 5 and 6 which are also soldered or otherwise suitably fastened to one end of the plates 3 and a short distance away from the point at which the trolley wires 1 and 2 are connected.

In order to change the path of the trolleys from the straight trolley wires 1 and 2 to the wires 5 and 6 I provide switches 7 pivoted at 8 to the plates 3. These switches, which are best shown in Fig. 4, are provided with flanges 9 and 10 which extend out from the base of the switch far enough for their edges to form a straight line with any of the trolley wires. These flanges diverge from one end of the switch to the other to form a V-shaped switch. The larger or wider end of the switch is pivoted at 8 and the more narrow end has a free movement laterally to allow either the flanges 9 or the flanges 10 to be brought in alinement or to register with the ends of the trolley wires 1 and 2. The proper lateral movement can be readily gaged, and the stops 11 and 12 may be provided to limit the movement of said switch in both directions. The plates 3 when arranged in pairs as shown in Fig. 1 are thereby adapted to be used with the double trolley system. I provide connecting bars 13 at the ends of the plates 3 thereby holding them rigidly together. Another bar 14 is provided between said bars 13 and has pivoted near the middle point thereof at 15 a lever arm 16. This lever arm 16 has a connecting bar 17 fastened to the end thereof which connects the two switch points 7 together. These bars are preferably provided at the top of the plates 3 and therefore require an elongated slot through said plate for the connection between the connecting bar 17 and the switch point 7; thus when the lever arm 16 is swung upon its pivot the connecting rod 7 will operate the switch points 7 to cause the trolleys to pass over the desired trolley wires.

On the side of one of the plates 3 I provide upright posts 18 which extend upwardly a suitable distance and have a shifting arm 19 pivoted near the top thereof. This shifting arm may be constructed of wire or other suitable metal and is provided with two upwardly extending arms 20 which are pivoted in the upright posts 18 and a horizontal engaging portion 21 which is on a plane below the trolley wires. The shifting arm is best shown in Fig. 7. An arm 22 connecting the two upwardly extending arms 20 of the shifting arm is provided and has connected thereto an operating arm 23 which is connected at the other end to the lever arm 16. Thus it is readily seen that when the shifting arm 19 is oscillated upon its pivots at the top of the upright posts 18 that the operating arm 23 will in turn oscillate the lever arm 16 which will shift the switches 7 accordingly. The shifting arm is always held in its innermost position by means of a spring 24, shown in Fig. 3.

The shifting arm is adapted to be shifted by a collapsible frame mounted on the trolley pole. This collapsible frame consists of a roller 25 substantially parallel to the trolley pole and connected thereto by means of links 26 as best shown in Fig. 5. Connected to the lower links 26 is a piston rod 27 of an air valve 28. This valve can be any type desired and can be operated by any source of power, the air valve being shown for the sake of simplicity. The air valve 28 is connected to the source of air supply by means of the pipe 29 which extends down the trolley pole and enters the vestibule of the car where the supply of air can be controlled by any suitable means within reach of the motorman or conductor. When the air valve 28 is charged with air the piston rod 27 will be forced upwardly thereby moving the links 26 to the position shown in dotted lines in Fig. 5, thereby bringing the engaging roller 25 in a position where it will engage the engaging portion 21 of the shifting arm and thereby move said shifting arm outwardly and operate the switches for the trolley wires. This collapsible frame can be constructed in any suitable manner and is so weighted that it will fall to its folded position as shown in Fig. 5 as soon as the air in the valve is released so that the pressure of the air in the valve should be great enough to preponderate over the pressure of the spring 24 which tends to hold the shifting arm in its innermost position. The movement of the shifting arm is best shown in Fig. 6 where the outer position is shown in dotted lines. The horizontal engaging portion 21 of the shifting arm is preferably provided with the inclined or V-shaped portion at one end to assure the proper engagement of the roller 25 therewith.

The shifting arm is preferably made of spring metal so that in case the collapsible frame forces out the shifting arm further than is necessary to move the switch the required distance no harm will be done to the mechanism.

Many modifications of my invention may be made without departing from its spirit and scope as defined in the appended claims and I do not wish to be confined to the exact details shown.

What I claim as new and desire to secure by Letters Patent is:

1. The combination with a trolley wire and trolley pole, of a plate connected to said trolley wire, a switch pivoted on said plate, a shifting arm mounted on said plate and having an engaging portion below said trolley wire, mechanism whereby said shifting arm is adapted to shift said switch, a collapsible frame mounted on said trolley pole adapted to engage said shifting arm when in its open position and when said trolley pole passes over said shifting arm and operating mechanism on said trolley pole for operating said collapsible frame, substantially as set forth.

2. The combination with a trolley wire and trolley pole, of a plate connected to said trolley wire, upright posts on said plate, a shifting arm pivoted at the top of said posts, an engaging portion on said shifting arm at a point below said trolley wire, a switch on said plate connected to said shifting arm and operating means on the trolley pole adapted to engage said shifting arm, substantially as and for the purposes set forth.

3. A trolley pole and trolley wire having a plate therein, two wires diverging from one end of said plate, a switch pivoted to said plate having flanges thereon, said flanges adapted to form a track or wire for said trolley to run over, upright posts on said plate, a shifting arm pivoted at the top of said posts and having a horizontal engaging portion below said trolley wire, a lever arm pivoted on an arm fastened to said plate, a connecting bar between said lever arm and said switch, an operating rod between said shifting arm and said lever arm whereby when said shifting arm is operated said lever arm is operated, in combination with a collapsible frame mounted on said trolley pole and adapted to rest in its collapsed position, and operating means for said collapsible frame whereby said collapsible frame is operated to engage said shifting arm, substantially as and for the purposes set forth.

4. The combination with a trolley wire and trolley pole, of a plate secured to said trolley wire, upright posts on said plate, a shifting arm pivoted at the top of said posts, an engaging portion on said shifting arm at a point below said trolley wire, a switch on said plate connected to said shifting arm and a roller mounted upon the trolley pole and adapted to engage said shifting arm, substantially as set forth and for the purposes specified.

5. The combination with a trolley wire and trolley pole, of a plate, a switch pivotally mounted on said plate, a shifting arm connected to said switch, a collapsible frame mounted on the trolley pole and adapted to normally rest in its collapsed position, and operating means mounted on the trolley pole adapted to engage said shifting arm, substantially as set forth and for the purposes specified.

JOSEPH WUERMLI.

Witnesses:
JAMES N. RAMSEY,
GOLDIE GORDON.

Copies of this patent may be obtained for five cents each, by addressing the "Commissioner of Patents, Washington, D. C."